US008776010B2

(12) United States Patent
Fisher et al.

(10) Patent No.: US 8,776,010 B2
(45) Date of Patent: *Jul. 8, 2014

(54) DATA TYPE PROVIDER FOR A DATA STORE

(75) Inventors: Jomo Fisher, Redmond, WA (US); Luke Hoban, Seattle, WA (US); Timothy Y. Ng, Bellevue, WA (US); Matteo Taveggia, Redmond, WA (US); Donald Syme, Grantchester (GB)

(73) Assignee: Microsoft Corporation, Redmond, WA (US)

( * ) Notice: Subject to any disclaimer, the term of this patent is extended or adjusted under 35 U.S.C. 154(b) by 335 days.

This patent is subject to a terminal disclaimer.

(21) Appl. No.: 12/912,875

(22) Filed: Oct. 27, 2010

(65) Prior Publication Data

US 2012/0110548 A1    May 3, 2012

(51) Int. Cl.
*G06F 9/44* (2006.01)
*G06F 9/45* (2006.01)

(52) U.S. Cl.
USPC ........... 717/106; 717/100; 717/108; 717/110; 717/140; 717/141; 717/146

(58) Field of Classification Search
None
See application file for complete search history.

(56) References Cited

U.S. PATENT DOCUMENTS

| | | | |
|---|---|---|---|
| 7,627,865 B2 * | 12/2009 | Muhlestein et al. | 717/165 |
| 7,676,815 B2 * | 3/2010 | Muhlestein et al. | 719/328 |
| 8,266,594 B2 * | 9/2012 | Balasubramanian | 717/125 |
| 2005/0288945 A1 * | 12/2005 | Melamed et al. | 705/1 |
| 2006/0015854 A1 * | 1/2006 | Muhlestein et al. | 717/130 |
| 2006/0075382 A1 | 4/2006 | Shaburov | |
| 2006/0090154 A1 * | 4/2006 | Bustelo et al. | 717/110 |
| 2007/0027905 A1 * | 2/2007 | Warren et al. | 707/103 R |
| 2007/0033520 A1 * | 2/2007 | Kimzey et al. | 715/513 |
| 2007/0038610 A1 * | 2/2007 | Omoigui | 707/3 |
| 2007/0106520 A1 * | 5/2007 | Akkiraju et al. | 705/1 |
| 2007/0168946 A1 * | 7/2007 | Drissi et al. | 717/110 |
| 2008/0201636 A1 * | 8/2008 | Fujiwara | 715/700 |

(Continued)

OTHER PUBLICATIONS

Keivanloo et al., "Semantic Web-based Source Code Search." 2010, In the proceedings of 2010 6th Intl. Workshop.*

(Continued)

*Primary Examiner* — Insun Kang
(74) *Attorney, Agent, or Firm* — Kevin Sullivan; Kate Drakos; Micky Minhas (57) ABSTRACT

A system and method for facilitating development of a computer program that interfaces with a data store. A system queries the data store to retrieve interface information, including schema information corresponding to a portion of data in the data store relevant to a user application. The system uses the retrieved information to provide an integrated development environment (IDE) to a user. The IDE may include one or more features such as completion lists, tool tips, and quick info. The schema information may be used to create synthetic types for use in the target program. The interface information may be used to create synthetic elements to be inserted into a target program. The synthetic types may be used to perform static type checking during an editing session or a program compilation, or to provide the IDE services. During a build, the synthetic elements may be removed and replaced with data store access code, which is subsequently used during program runtime to access the store. The system enables a user to work with the data store as they would for built-in parts of their program.

22 Claims, 9 Drawing Sheets

(56) References Cited

U.S. PATENT DOCUMENTS

2008/0244528 A1* 10/2008 McCollum et al. ........... 717/127
2008/0270983 A1 10/2008 Ahadian
2009/0144696 A1* 6/2009 Andersen ..................... 717/109
2009/0254880 A1* 10/2009 Gryko et al. .................. 717/109

OTHER PUBLICATIONS

Reiss, "Semantics-Based Code Search," IEEE, 2009.*
Pozen, Zina., "WMI and .NET: System.Management Lets You Take Advantage of WMI APIs within Managed Code", Retrieved at << http://msdn.microsoft.com/en-us/magazine/cc302051.aspx >>, May 2002, pp. 9.
Friedrich, Martin., "Making WMI Queries In C++", Retrieved at << http://www.codeproject.com/KB/system/UsingWMI.aspx >>, May 30, 2005, pp. 21.
Hughes, et al., "Say Goodbye to Quirky APIs: Building a WMI Provider to Expose Your Object Info", Retrieved at << http://msdn.microsoft.com/en-us/magazine/cc302342.aspx >>, May 2000, pp. 11.
"Technology Summary for WMI .NET", Retrieved at << http://msdn.microsoft.com/en-us/library/ms257353(VS.80).aspx >> Retrieved Date Jul. 26, 2010, pp. 4.
Cohen, Oren., "A Simple Guide to WMI Provider", Retrieved at << http://www.dotnetheaven.com/Uploadfile/falkor/WMIProviderGuide02022006230941 PM/WMIProviderGuide.aspx >>, Oct. 14, 2003, pp. 7.
"Windows Management Interface (WMI)", Retrieved at << http://www.wilsonmar.com/1wmiwbem.htm >>, Retrieved Date: Jul. 26, 2010, pp. 8.
Bollacker, et al., "Freebase: A Shared Database of Structured General Human Knowledge", Retrieved at << http://www.aaai.org/Papers/AAAI/2007/AAAI07-355.pdf >>, Apr. 23, 2007, pp. 1962-1963.
Rios, et al., "Magallanes: A Web Services Discovery and Automatic Workflow Composition Tool", Retrieved at << http://www.imamu.edu.sa/DContent/IT_Topics/java/1471-2105-10-334.pdf >>, Oct. 15, 2009, pp. 1-12.
Bollacker, et al., "Freebase: A Collaboratively Created Graph Database for Structuring Human Knowledge", Retrieved at << http://ids.snu.ac.kr/w/images/9/98/SC17.pdf >>, 2008, pp. 1247-1249.
Tran, et al., "Metalevel Information in Ontology-Based Applications", Retrieved at << http://fwi-aifbportal.wiwi.uni-karlsruhe.de/images/d/d2/2008_1747_Tran_Metalevel_Infor_1.pdf >>, 2008, pp. 6.
Cheung, et al., "YeastHub: A Semantic Web Use Case for Integrating Data in the Life Sciences Domain", Retrieved at << http://bi.snu.ac.kr/SEMINAR/ISMB2005/papers/5.pdf >>, vol. 21, No. 1, Mar. 27, 2005, pp. i85-i96.
Knublauch, et al., "The Prot'eg'e OWL Plugin: An Open Development Environment for Semantic Web Application", Retrieved at << http://protege.stanford.edu/plugins/owl/publications/ISWC2004-protege-owl.pdf >>, 2004, pp. 229-243.
Keivanloo, et al., "Semantic Web-based Source Code Search", Retrieved at << http://www.abdn.ac.uk/~r01srt7/swese2010/pdf/swese2010_submission_2-1.pdf >>, pp. 16, 2010, In Proceedings of 2010, 6th Intl.Workshop.
Hilsdale, Erik, "Advice Weaving in AspectJ", in International Conference on Aspect-Oriented Software Development (AOSD) '04, p. 26-35, Association for Computing Machinery, Mar. 2004.
"Office Communication Concerning U.S. Appl. No. 12/1912,813—Final Rejection", USPTO, Oct. 2, 2013.

* cited by examiner

DATA TYPE PROVIDER FOR A DATA STORE

CROSS-REFERENCE TO RELATED APPLICATIONS

The present invention is related to copending U.S. patent application entitled "Data Type Provider For A Web Semantic Store," Ser. No. 12/912,813, filed concurrently herewith, the contents of which are hereby incorporated by reference herein.

BACKGROUND

A computer operating system typically collects various instrumentation information related to the operating system, processes executing thereupon, and hardware upon which the operating system executes or interacts with. Examples of instrumentation information may include CPU loads, memory usage, temperatures, number of processes, or the like. The operating system may write the instrumentation information into a database for subsequent retrieval by the operating system or other computer programs. The Common Information Model (CIM) is a standard that describes how such information is represented, and provides mechanisms to control and manage the information. The Windows Management Instrumentation, by Microsoft Corporation, is an implementation of CIM. It provides an interface through which instrumented components provide information and notifications. A description of WMI is available One technique for querying WMI is to form strings that contain SQL queries, and pass the strings to a WMI API at runtime. In some cases, an error in such a string may not be identified until runtime.

A Web-based semantic store is a schematized database of information accessible over a network. A Web-based semantic store (WSS) may be self-describing, which enables a component to query the WSS for its schema, or a portion thereof. Freebase, available, is an example of a WSS available on the Internet. It provides categorized and typed information. Freebase is dynamic, and can be edited by many people.

Developing program code that interacts with schematized store may add complexity to the task of program development. Generally, during program development, it is desirable to detect errors at design time or compile time. However, some errors may be introduced that are not detected until the program is executed. Some libraries that assist in interfacing with a schematized store may be quite large. The size of a library may be detrimental to good program development or deployment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, in one embodiment, a system, method, and components operate to facilitate development of a computer program that interfaces with a Web semantic store. In one embodiment, a system may query a Web semantic store to retrieve interface information, and use the retrieved information to provide an integrated development environment to a user. The interface information may include a list of data identifiers corresponding to data items that are available for retrieval, and a schema descriptive of the data items. In one embodiment, the system may create synthetic elements based on the interface information. A synthetic element may include a name of a property or method. It may also include a corresponding type.

In one embodiment, a system, method, and components operate to facilitate development of a computer program that interfaces with an operating system instrumentation store. A system may query an operating system instrumentation store to retrieve interface information, and use the retrieved information to provide an integrated development environment to a user. The interface information may include a list of data identifiers corresponding to data items that are available for retrieval, and a schema descriptive of the data items. In one embodiment, the system may create synthetic elements based on the interface information. A synthetic element may include a name of a property or method and a corresponding type.

In one embodiment, mechanisms may provide a completion list, each element of the completion list corresponding to a data identifier of an OSIS, each data identifier having a corresponding data type. In response to a user selection of an item from the completion list, mechanisms may insert a synthetic method or property name into a target program source code, the synthetic method or property name representing the selected data identifier.

In one embodiment, a compiler may translate a synthetic method or property name into program code that accesses an OSIS, enabling the target program to retrieve data items during runtime of the target program. The program code may be inserted into an intermediate language representation of the target program.

In one embodiment, a compiler may perform static type checking of a synthetic method or property name based on a provided schema element. The static type checking may be performed during an editing session or during a program module compilation.

Mechanisms described herein may operate to facilitate an environment in which interfaces with an OSIS or WSS provide a similar user experience to interfacing with methods or variables that are defined within the user program. This may include a similar experience with an IDE, with compilation, or with access to documentation. From a user's perspective, development may appear such that an OSIS or WSS is built into the program.

To the accomplishment of the foregoing and related ends, certain illustrative aspects of the system are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

To assist in understanding the present invention, reference will be made to the following Detailed Description, which is to be read in association with the accompanying drawings, wherein.

DETAILED DESCRIPTION

Example embodiments of the present invention now will be described more fully hereinafter with reference to the accompanying drawings, which form a part hereof, and which show, by way of illustration, specific example embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to a previous embodiment, though it may. Furthermore, the phrase "in another embodiment" as used herein does not necessarily refer to a different embodiment, although it may. Thus, various embodiments of the invention may be readily combined, without departing from the scope or spirit of the invention. Similarly, the phrase "in one implementation" as used herein does not necessarily refer to the same implementation, though it may, and techniques of various implementations may be combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "method," when referring to a portion of code within a target program, refers to a portion of code within a larger program that performs a specific task, and can execute relatively independent of other portions of the program. A method may, but does not necessarily, return a value. In various computer languages, different terms may be used, such as subroutine, function, procedure, or subprogram. As used herein, the term "method" may include all of these. A synthetic method call may appear in source code as a regular method call, though it does not necessarily have a corresponding method, as explained herein.

The components described herein may execute from various computer-readable media having various data structures thereon. The components may communicate via local or remote processes such as in accordance with a signal having one or more data packets (e.g. data from one component interacting with another component in a local system, distributed system, or across a network such as the Internet with other systems via the signal). Software components may be stored, for example, on non-transitory computer-readable storage media including, but not limited to, an application specific integrated circuit (ASIC), compact disk (CD), digital versatile disk (DVD), random access memory (RAM), read only memory (ROM), floppy disk, hard disk, electrically erasable programmable read only memory (EEPROM), flash memory, or a memory stick in accordance with embodiments of the present invention.

As used herein, the term "data items" refer to data that is retrieved, or available for retrieval, from a data store such as a WSS or OSIS. The term "data identifier" refers to a reference to one or more data items. A data identifier may be a name or symbol that corresponds to the data item and is used to identify it. Data identifiers may be in the form of text strings, graphic images, or other representations. Schema items corresponding to one or more data items are referred to as "schema elements." A schema element may describe a data type of a data item. A schema element corresponding to a method may describe a number of arguments, a type for each argument, a return value type, or other information. A data identifier is a specific type of schema item. For example, a schema corresponding to people may include a list of data identifiers corresponding to the individuals, such as "first name," "last name," "birth date," "birth place," or the like. The schema may also indicate that the data item corresponding to the data identifier "first name" is a Unicode string of less than 32 characters.

The term computer-readable media as used herein includes both non-transitory storage media and communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media.

Figure 1:
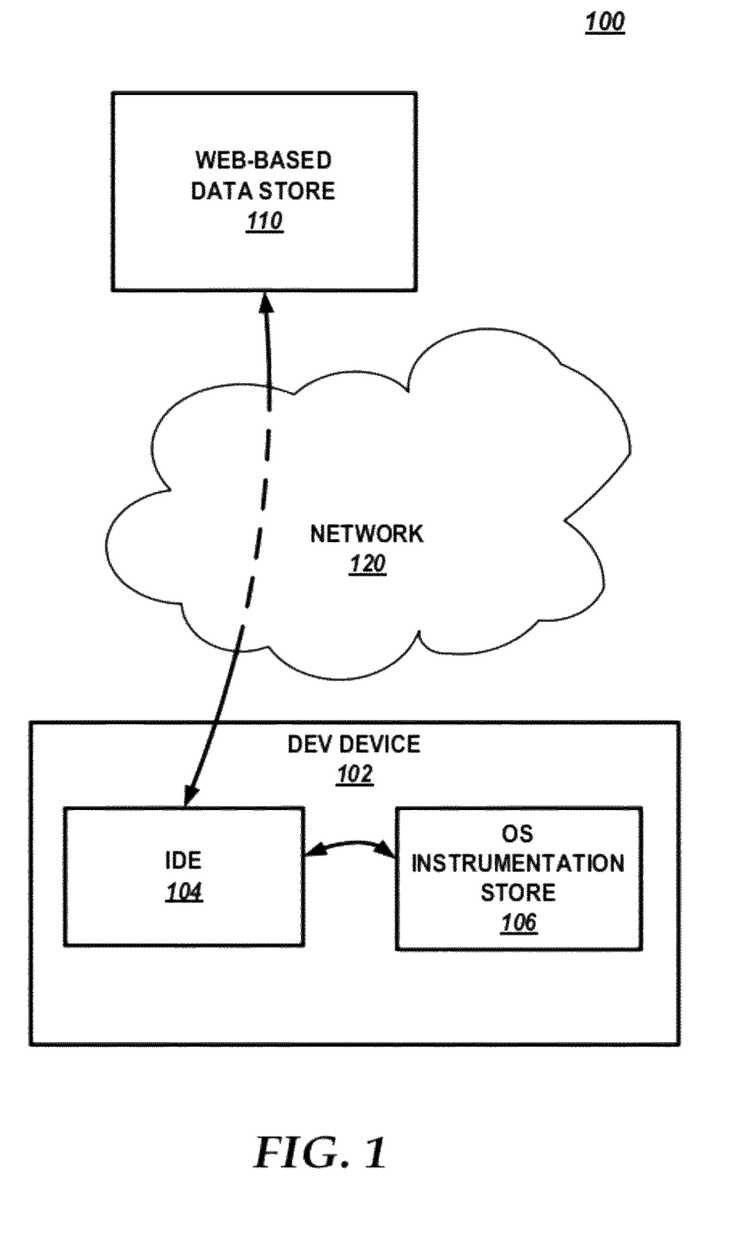
FIG. 1 is a block diagram of an example environment in which mechanisms described herein may be deployed.

FIG. 1 is a block diagram of an example environment 100 in which mechanisms described herein may be deployed. FIG. 1 provides a basic understanding of an example environment, though many configurations may be employed and many details are not illustrated in FIG. 1. As illustrated in FIG. 1, an example environment 100 includes development device 102. Development device 102 is a computing device that may be used by a program developer to create, edit, test, or debug a target computer program. In some environments, the functions and components of development device 102 may be replicated or distributed among two or more computing devices, though a single device is illustrated herein to represent one or more such computing devices.

As illustrated in FIG. 1, development device 102 may include integrated development environment (IDE) 104. An Integrated Development Environment (IDE) is a set of tools that assist a programmer to develop software. An IDE may include a source code editor, compiler, and debugger. It may include a browser that allows a programmer to view a class hierarchy, information about classes, methods, or other program elements. Embodiments of IDEs are discussed in further detail herein.

Development device 102 may further include operating system instrumentation store 106. An operating system may instrument numerous components or events of an operating system, computing system, or environment in which it operates. The OS may store the instrumentation values in an OS instrumentation store, for access by the OS or a requesting component. Examples of OS instrumentations include a number of processes executing, a processor temperature, memory usage, CPU load, or the like.

As illustrated, environment 100 includes Web-based semantic store 110. Web-based semantic store (WSS) 110 may be stored on storage components of one or more computing devices. It may be implemented as a web site or web service or employ a web site or web service as a front end to interface with the stored data. Web-based semantic store 110 may itself access data from one or more other data stores. In one embodiment, Web-based semantic store 110 may retrieve data from a computing device or other component in response to a request for data. In one configuration, Freebase serves as WSS 110. Development device 102 may communicate with WSS 110 via network 120.

Network 120 may include a local area network, a wide area network, or a combination thereof. In one embodiment, network 120 includes the Internet, which is a network of networks. Network 120 may include wired communication mechanisms, wireless communication mechanisms, or a combination thereof. Communications between development device 102 and Web-based semantic store 110 may employ one or more of various wired or wireless communication protocols, such as IP, TCP/IP, UDP, HTTP, SSL, TLS, FTP, SMTP, WAP, Bluetooth, and WLAN.

Briefly, in one embodiment, mechanisms described herein may be used to facilitate development of target programs that perform queries to an OS instrumentation store (OSIS), the OSIS having a schema corresponding to its virtual or actual data structures. In some embodiments, facilitating development of such programs may include one or more of: generating and presenting synthetic types to a user for use during program development, the synthetic types representative of the OSIS schema; presenting information descriptive of the synthetic types or the query targets; performing static type checking of synthetic types used in the target program; inserting program source code representative of the synthetic types into the target program; inserting a lower level program code for performing OSIS queries into the target program; or other actions to facilitate program development.

In one embodiment, mechanisms described herein may be used to facilitate development of target programs that perform queries to a Web-based semantic store (WSS), the WSS having a schema corresponding to its virtual or actual data structures. In some embodiments, facilitating development of such programs may include one or more of: generating and presenting synthetic types to a user for use during program development, the synthetic types representative of the WSS schema; presenting information descriptive of the synthetic types or the query targets, inserting program source code representative of the synthetic types into the target program; inserting a lower level program code for performing WSS queries into the target program; or other actions to facilitate program development.

Figure 2:
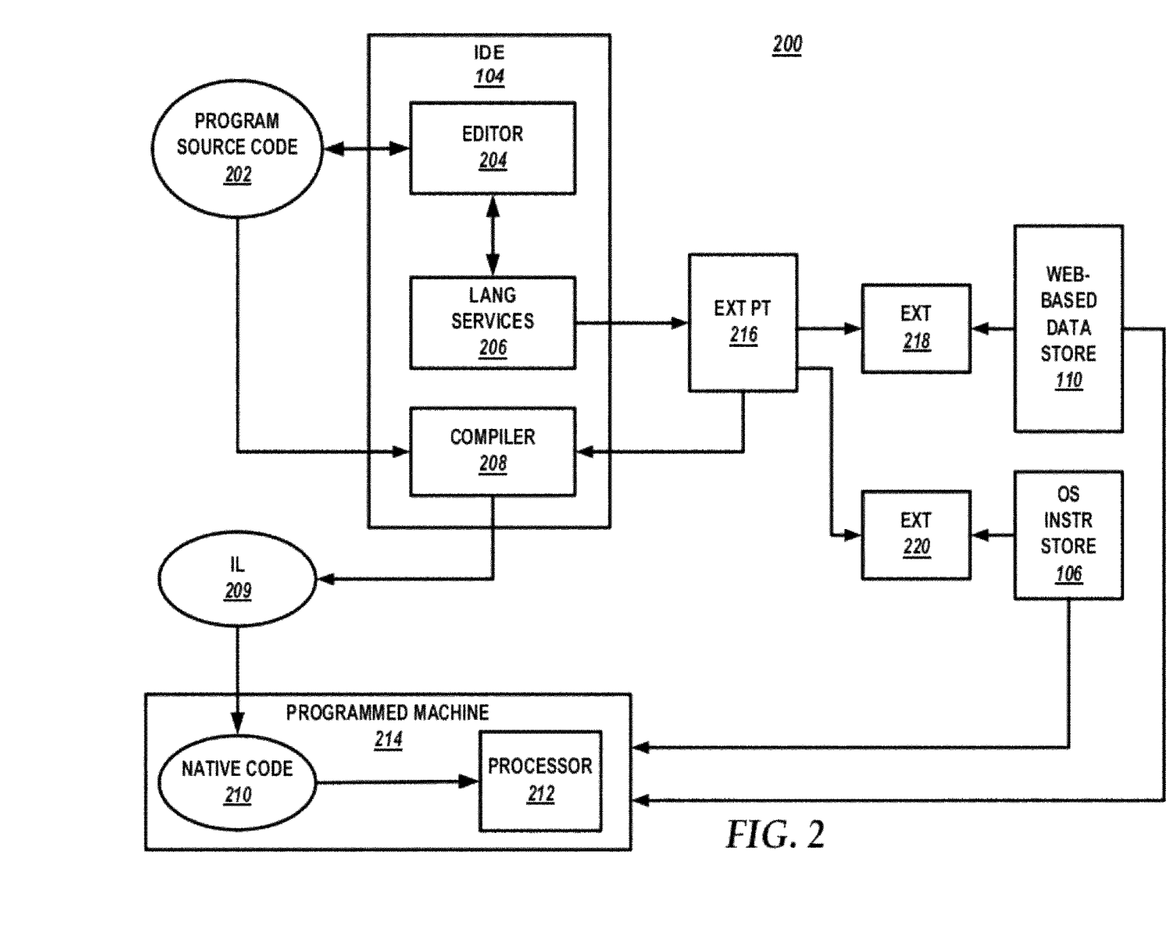
FIG. 2 is a block diagram of an example computer system in which mechanisms described herein may be deployed.

FIG. 2 is a block diagram of an example computer system 200 in which mechanisms described herein may be deployed. The illustrated example system 200 includes IDE 104, OSIS 106, and WSS 110 as discussed with respect to FIG. 1. OSIS 106 has a corresponding extension component 220; WSS has a corresponding extension component 218. Extension components are referred to herein as simply "extensions." One embodiment includes OSIS 106 and extension 220, omitting WSS 110 and extension 218. One embodiment includes WSS 110 and extension 218, omitting OSIS 106 and extension 220.

Visual Studio®, by Microsoft Corp., is one example of an IDE that may be represented by IDE 104, though other IDEs may be employed. In the illustrated embodiment, IDE 104 includes editor 204, language service 206, and compiler 208. Editor 204 may be a software component that enables a user to view, write, or modify source code. Editor 204 may include a user interface component that displays source code 202 and receives input text and commands from a user. Editor 204 may include a number of features that provide information relating to a computer program or portion thereof, facilitate editing functions, or the like. In some embodiments, editor 204 may include features that indicate syntactical or semantic errors, suggest corrections, or facilitate entering correct program code. In various configurations, functions of editor 204 may be distributed across multiple components or combined with other components of system 200, including those not illustrated.

Source code 202 may include source code in one or more programming languages. C, C++, C#, F#, VISUAL BASIC®, and JAVA® are examples of programming languages that may be the language of source code 202 or a portion thereof.

In the illustrated embodiment, IDE 104 includes compiler 208, which translates program source code 202 into native code 210. Though compiler 208 is illustrated as a single component, in various embodiments, it may include one or more subcomponents, and may generate one or more intermediate representations of a computer program. For example, in one embodiment, compiler 208 may include a front end that generates intermediate language representation (IL) 209, and a code generator that translates IL 209 into native code 210. In one configuration, the system may use just-in-time (JIT) compilation. Generally, a JIT compiler may employ a mechanism in which an intermediate language representation of a program function is loaded and translated into a native language representation in response to its first invocation.

Native code 210 may be a machine language, a virtual machine language, or another representation that may be executed by a physical or virtual processor. Processor 212 may receive native code 210 and execute program instructions. The combination of processor 212 and native code 210 produces programmed machine 214, which contains logic to execute the target program. In one configuration, processor 212 may include one or more central processing units, one or more processor cores, an ASIC, or other hardware processing component and related program logic. In one configuration, processor 212 may include a software component simulating a hardware processing unit. Processor 212 executes instructions in the native code 210. As used herein, the term "runtime" refers to the execution of target program instructions, or libraries, assemblies, or executable files that interact with the target program.

Language service 206 is a set of one or more components that enhance the program development experience. It may interact with editor 204 to present information to a user, facilitate insertion of program code into program source code 202 identify synthetic types, method names, argument specification, tooltips, class properties, or other information. Editor 204, in conjunction with language service 206 or compiler 208, may act as a discovery tool. An example of a use of this feature may be that of a programmer who is entering source code to indicate a reference to a method or variable associated with an object. After entering the object identifier, followed by a period, language service 206 may create a list containing names of methods that are available to be invoked to the identifier, names of variables associated with the identifier, or a combination thereof. As described herein, in some contexts, language service 206 may perform some actions to determine a class, or a possible class, corresponding to the object identifier. As further described herein, a determined class, method, parameter, or variable may be synthesized based on a schema of an external data source such as OSIS 106 or WSS 110.

For example, in an IDE, developers may enter a period following an object name to view available properties or information related to the object. The IDE may display a list of available choices, including available methods or properties. The programmer may select an item from the list. In response, editor 204 may insert the selected item, or program code representative of the item, into the target program at the current location. In accordance with some of the mechanisms described herein, this feature may be available with program code that accesses OSIS 106 or WSS 110.

IDE 104 may provide a variety of features that use the received information. Examples of such features include syntax highlighting, auto-completion, bracket matching, argument specification, method lists, tooltips, and syntax error-checking.

In one embodiment, OSIS 106 may have a corresponding extension 220 that is configured based on the schema of OSIS 106. Extension 220 may include a list of the instrumentation data that is available to be queried by the target program. It may further include a type specification for each data item and a synthesized name to be inserted into program source code 202. Examples of this are provided herein.

In one embodiment, WSS 110 may have a corresponding extension 218 that is configured based on the schema of WSS 110. Extension 218 may include a list of the Web-based data that is available to be queried by the target program. It may further include a type specification for each data item and a synthesized name to be inserted into program source code 202. Examples of this are provided herein.

In one implementation, extension point 216 may serve as an interface between language service 206 or compiler 208 and each extension. Extension point 216 may, in response to a query from language service 206 or compiler 208, provide the data described above from extension 218 or 220. In various configurations, extension point 216 may be integrated with compiler 208, language service 206, or editor 204, and perform actions as described herein. Compiler 208, language service 206, or editor 204 receive the information corresponding to each external data source and provides a development experience that is similar to that received when accessing static types defined within the target program or project. This may include providing a portion of source code that includes a synthetic variable or method name such that it has an appearance of a variable or method defined in the source code of the program. In one embodiment, computer system 200 may include the Windows .NET framework, by Microsoft Corporation. The system may be configured such that a user perceives references to OSIS 106 or WSS 110 in a manner that appears as standard .NET types or members. The user does not need to handle synthetic variables or methods differently from the standards of .NET.

Figure 3A:
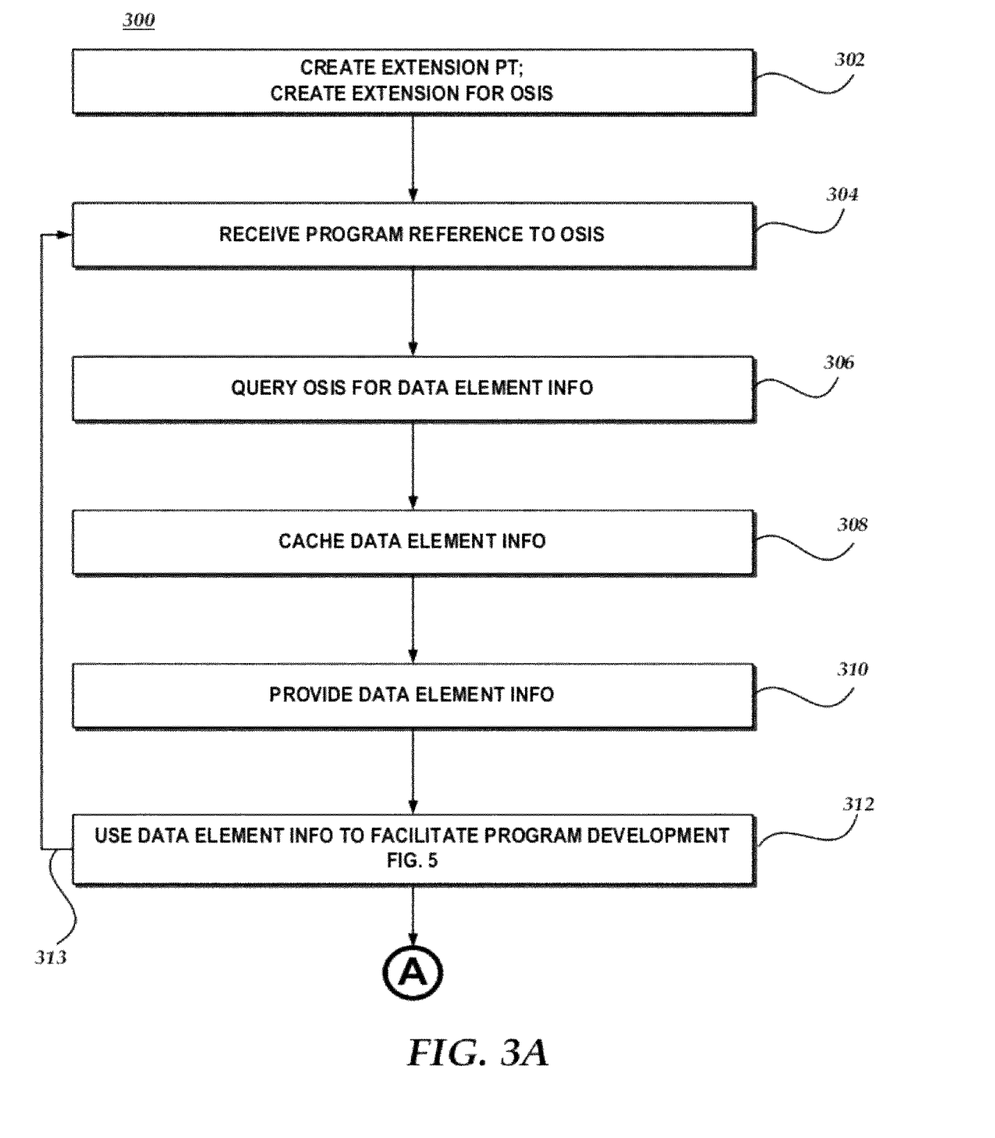
FIGS. 3A-B show a flow diagram illustrating an example embodiment of a process for facilitating development of a computer program that interfaces with an operating system instrumentation store.
Figure 3B:
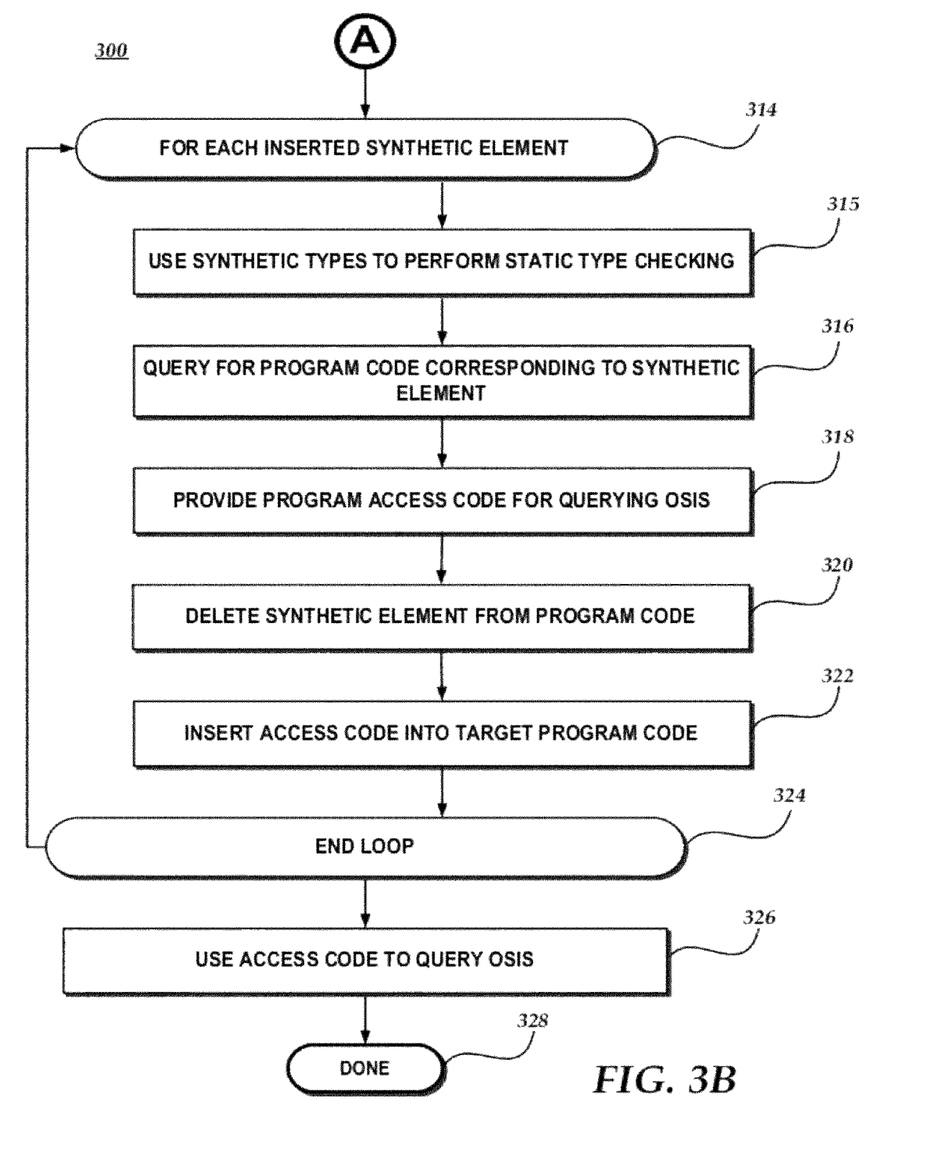

FIGS. 3A-B show a flow diagram illustrating an example embodiment of a process 302 for facilitating development of a computer program that interfaces with an operating system instrumentation store, such as OSIS 106. Process 300, or a portion thereof, may be performed by various embodiments of system 200 or a variation thereof. The illustrated portions of process 300 may be initiated at block 302, where an extension point for extending an IDE may be created or provided. An extension corresponding to OSIS 106 may be created or provided. The extension may include logic specific to OSIS 106. It may include logic or data to indicate how the information from OSIS 106 is to be represented within the target program. This may include synthetic method names or properties, and corresponding schema elements, such as data types. It may further include logic or data descriptive of IL or other program code that represents instructions to query the OSIS. In one implementation, the extension may indicate a class that represents the OSIS. The class, or one or more subclasses, may include synthetic types, methods, or properties to be exposed to a user.

The process may flow to block 304, where a reference to the OSIS may be received. This may be in response to a triggering event such as an insertion of a period following a name associated with the OSIS. An example triggering event is the insertion of the string "Data.WMI." in an editor. Another example triggering event is placement of the cursor at the location following the string "Data.WMI.Win32_Processor." in an editor. In one embodiment, the actions of block 304 may be performed by extension point 216.

The process may flow to block 306, where the OSIS may be queried for schema information or data identifiers corresponding to the received reference. For example, in response to receiving the string "Data.WMI.Win32_Processor.", the OSIS may be queried for identification of data items associated with the processor, and the schema corresponding to each data item. In one embodiment, the schema elements that are queried for and retrieved are a portion of the OSIS schema. In some configurations, the retrieved portion may be small compared with the entire schema. This allows for more efficient retrieval, caching, or storage of schema information. The small portion may, for example be limited to schema elements that descriptive of the queried data items.

The process may flow to block 308, where the data received at block 308 may be stored in a cache. The cached data may be used in one or more subsequent queries. For example, in a subsequent query at block 306, a test may be made to determine if the desired data is stored in the cache. If it is, the data may be retrieved from the cache instead of querying the OSIS.

The process may flow to block 310, where type info, method names, or properties associated with the received reference may be provided. In some implementations, this may be provided by extension 220 to language service 206 or compiler 208, via intermediary extension point 216. Names that are provided may be a translation of data identifiers provided by the OSIS in response to a query. For example, in response to a query, the OSIS may return a list of strings, each string identifying a corresponding data item. Each string may be translated into a corresponding property name for use in a target program. One or more schema elements associated with each data item may be translated into a "synthetic" data type for use in the target program.

Figure 5:
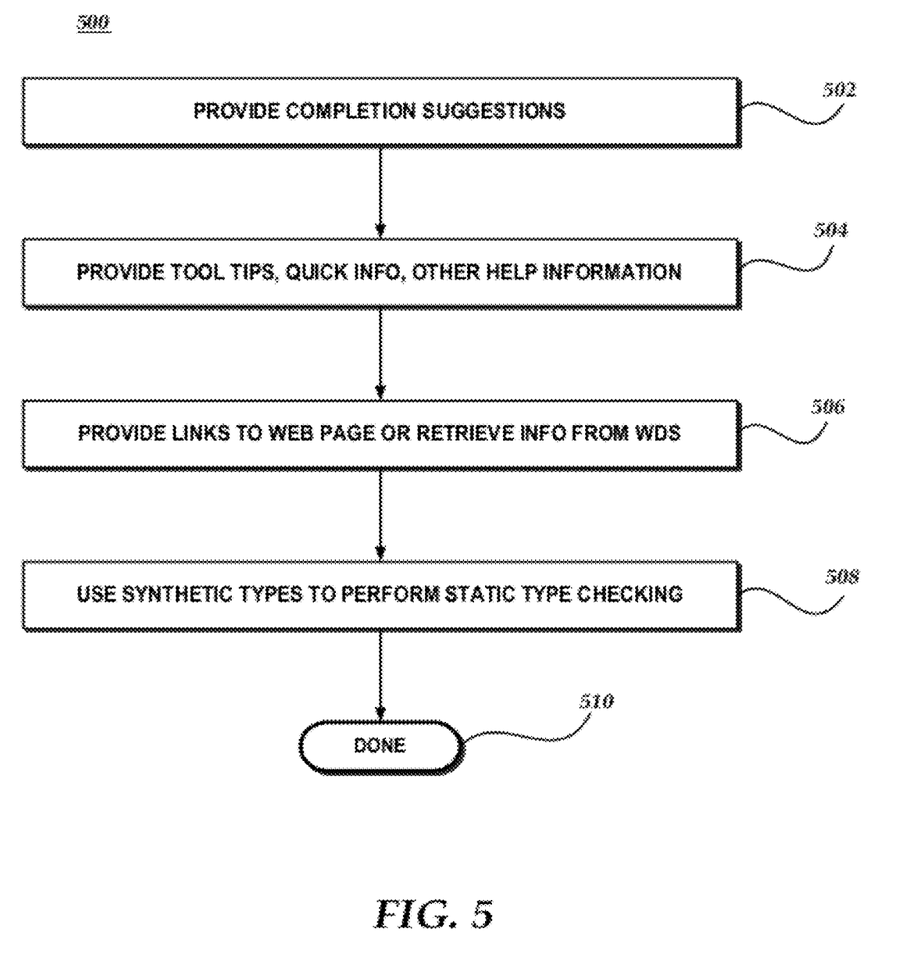
FIG. 5 illustrates a process for using a synthetic element and corresponding information to facilitate program development.

The process may flow to block 312, where the schema elements are used to facilitate program development. The editor may provide to a user an experience for querying the OSIS that is similar to that for reference objects internal to the target program. This may include programmer aids such as auto-completion, argument specification, tooltips, or the like. Data type information may be used to perform static type checking with the synthetic properties or methods. FIG. 5 illustrates a process 300 that may be performed to implement at least a portion of the actions of block 312.

As indicated by arrow 313, the actions of blocks 304-312 may be performed once or repeated any number of times, based on user actions, editor logic, or other constraints. In one embodiment, the actions of blocks 304-312 are performed during an editing session, in which a user may be editing program source code. As indicated by the symbol "A", blocks 314-328 of process 300 are included in FIG. 3B, which is a continuation of FIG. 3A. The process may flow to loop 314 (FIG. 3B), which iterates for each inserted synthetic element. Loop 314 may be performed in response to a user command to compile a target program module. Loop 314 includes blocks 315-322, and is terminated at block 324.

At block 315, where synthetic types derived from schema element information may be used to perform static type checking of the program code. For example, the schema information may indicate that a query will return a result that is a string. A synthetic type of string may be created and used for a corresponding method call or property. An assignment of this data to a variable may be checked for type matching. This may be made to appear similar to that for a variable that has a type statically declared in the program code. Type errors may be made to appear similar to errors for a variable that has a type statically declared in the program code.

At block 316, the extension may be queried for program access code corresponding to a synthetic element. In some implementations and configurations, the program access code may be retrieved from a cache, if it is available.

Figure 6A:
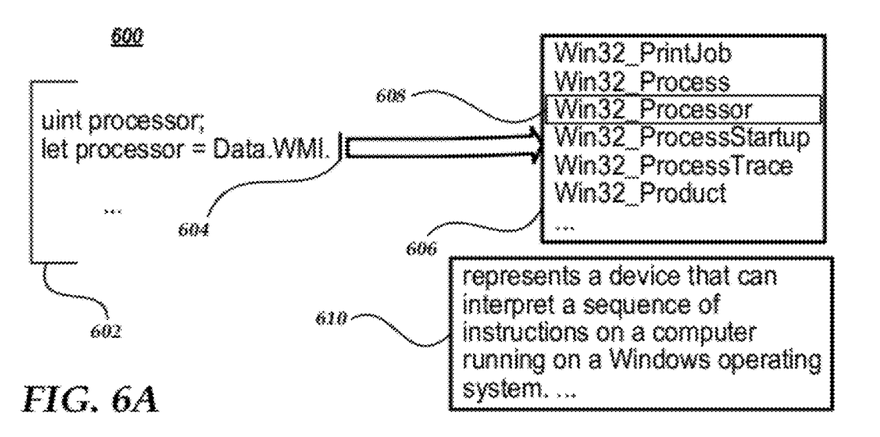
FIGS. 6A-C illustrates example screen shots of a user interface that facilitates program development in accordance with at least some mechanisms described herein.

The process may flow to block 318, where program access code for querying the OSIS is provided. FIG. 6 provides an example of a synthetic element and corresponding program access source code. Though FIG. 6 illustrates source code, in one embodiment, the extension may provide intermediate language code to be inserted into the IL produced by the compiler. In various embodiments, source code or native code may be inserted.

The process flow may flow to block 320, where the synthetic element is deleted from the target program, or an intermediate version thereof. In one implementation, the compiler may perform this action after it has used the synthetic element to perform type-checking or to retrieve program access source code. In one implementation, deleting the synthetic element may be performed by omitting an action of including the element in an intermediate version of the program code as contrasted with including other elements or representations thereof. In one implementation, deleting the synthetic element may be performed by marking the element in a manner to indicate that further processing of the element is not to be performed; for example, it may be indicated in comment delineation.

The process may flow to block 322, where the program access code may be inserted into the target program. It is to be noted that the insertion of program access code may be performed at any of various compilation stages. For example, insertion of IL may be performed as part of a translation of source code into an intermediate language.

The process may flow to block 324, which terminates loop 314. It may loop back to loop 314 or exit the loop, based on source program configuration, compiler logic, or process implementation.

Though not illustrated in process 300, in one embodiment, the process may include using a synthetic type corresponding to a synthetic element to perform static type checking. This may be performed by the compiler during a compilation phase, during an editing session, or at another time. This action is illustrated and discussed in FIG. 5 herein.

After exiting loop 314, the process may flow to block 326. Though not illustrated in FIG. 3, the actions of block 326 may be performed during runtime of the target program, and may be based on the logic of the target program, as well as other factors. At block 326, at least a portion of the access code previously inserted into the target program may be used to query the OSIS. This block may be repeated any number of times, based on program logic. The queries of block 326 may retrieve data from the OSIS, as indicated in FIG. 2.

The process may flow to block 326, and exit or return to a calling program.

Figure 4A:
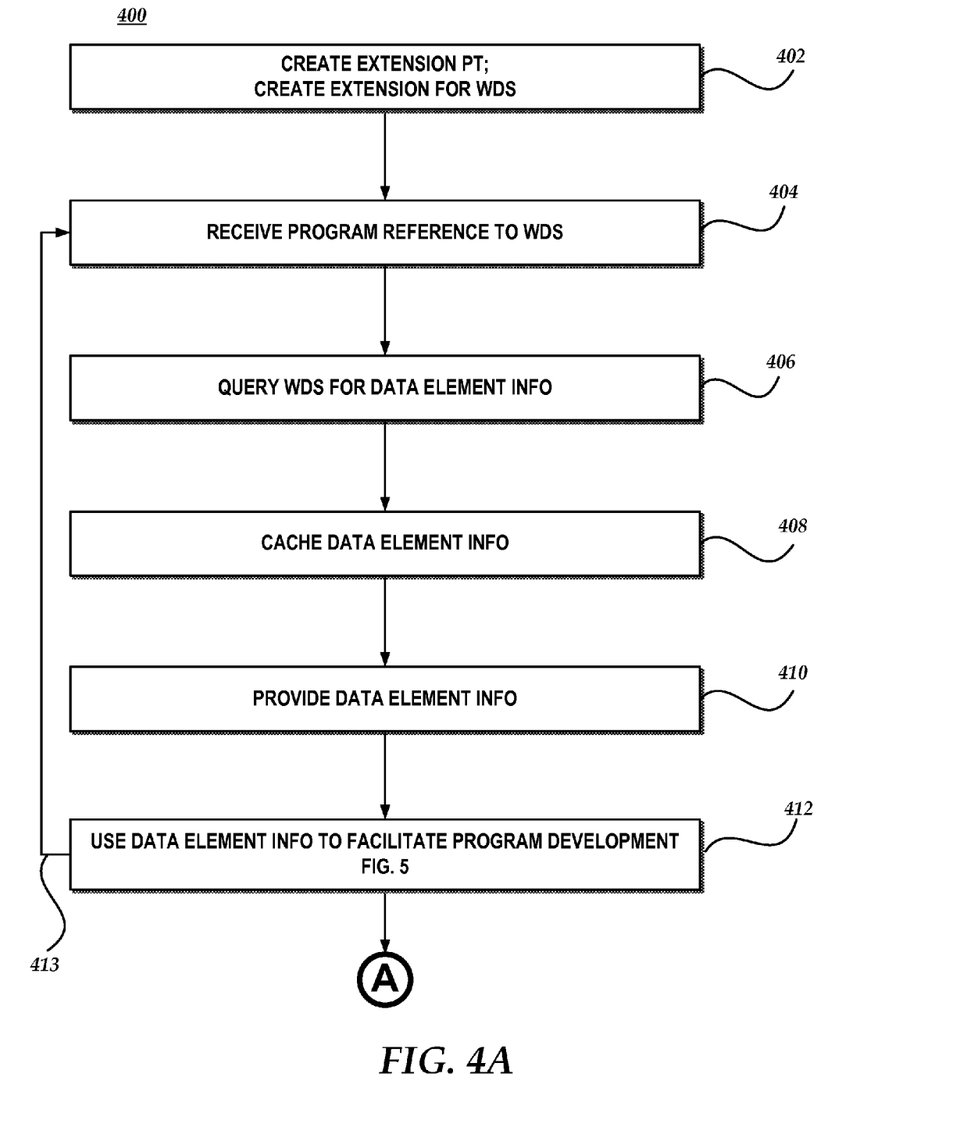
FIGS. 4A-B show a flow diagram illustrating an example embodiment of a process for facilitating development of a computer program that interfaces with a Web-based semantic store.
Figure 4B:
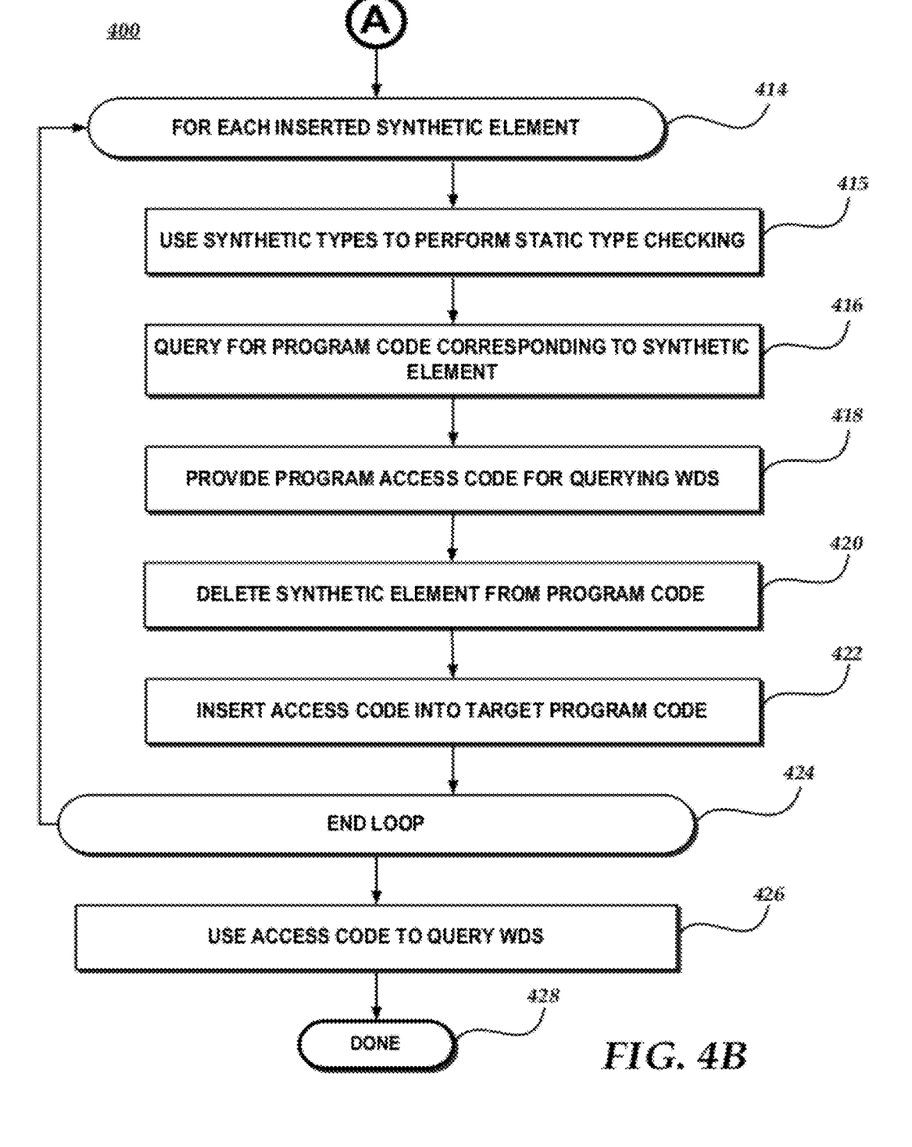

FIGS. 4A-B show a flow diagram illustrating an example embodiment of a process 402 for facilitating development of a computer program that interfaces with Web-based semantic store, such as WSS 110. Process 400, or a portion thereof, may be performed by various embodiments of system 200 or another system. The illustrated portions of process 400 may be initiated at block 402, where an extension point for extending an IDE may be created or provided. An extension corresponding to WSS 110 may be created or provided. The extension may include logic specific to WSS 110. It may include logic or data to indicate how the information from WSS 110 is to be represented within the target program. This may include synthetic method names or properties, and corresponding schema elements, such as data types. It may further include logic or data descriptive of IL or other program code that represents instructions to query the WSS. In one implementation, the extension may indicate a class that represents the WSS. The class, or one or more subclasses, may include synthetic types, methods, or properties to be exposed to a user.

The process may flow to block 404, where a reference to the WSS may be received. This may be in response to a triggering event such as an insertion of a period following a name associated with the WSS. An example triggering event is the insertion of the string "Data.WMI." in an editor. Another example triggering event is placement of the cursor at the location following the string "Data.WMI.Win42_Processor." in an editor. In one embodiment, the actions of block 404 may be performed by extension point 216.

The process may flow to block 406, where the WSS may be queried for type information or data identifiers corresponding to the received reference. In one embodiment, the schema elements that are queried for and retrieved are a portion of the WSS schema. In some configurations, the retrieved portion may be small compared with the entire schema. This allows for more efficient retrieval, caching, or storage of schema information. The small portion may, for example be limited to schema elements that descriptive of the queried data items.

The process may flow to block 408, where the data received at block 408 may be stored in a cache. The cached data may be used in one or more subsequent queries. For example, in a subsequent query at block 406, a test may be made to determine if the desired data is stored in the cache. If it is, the data may be retrieved from the cache instead of querying the WSS.

The process may flow to block 410, where type info, method names, or properties associated with the received reference may be provided. In some implementations, this may be provided by extension 220 to language service 206 or compiler 208, via intermediary extension point 216. Names that are provided may be a translation of data identifiers provided by the WSS in response to a query. For example, in response to a query, the WSS may return a list of strings, each string identifying a corresponding data item. Each string may be translated into a corresponding property name for use in a target program. One or more schema elements associated with each data item may be translated into a "synthetic" data type for use in the target program.

The process may flow to block 412, where the schema elements are used to facilitate program development. The editor may provide to a user an experience for querying the WSS that is similar to that for reference objects internal to the target program. This may include programmer aids such as auto-completion, argument specification, tooltips, or the like. Schema element information may be used to perform static type checking with the synthetic properties or methods during an editing session or in a compilation phase. FIG. 5 illustrates a process 500 that may be performed to implement at least a portion of the actions of block 412.

As indicated by arrow 413, the actions of blocks 404-412 may be performed once or repeated any number of times, based on user actions, editor logic, or other constraints. In one embodiment, the actions of blocks 404-412 are performed during an editing session, in which a user may be editing program source code. As indicated by the symbol "A", blocks 414-428 of process 400 are included in FIG. 4B, which is a continuation of FIG. 4A. The process may flow to loop 414 (FIG. 4B), which iterates for each inserted synthetic element. Loop 414 may be performed in response to a user command to compile a target program module. Loop 414 includes blocks 415-422, and is terminated at block 424.

At block 415, where synthetic types derived from schema element information may be used to perform static type checking of the program code, similar to the actions described for block 315.

At block 416, the extension may be queried for program access code corresponding to a synthetic element. In some implementations and configurations, the program access code may be retrieved from a cache, if it is available.

The process may flow to block 418, where program access code for querying the WSS is provided. FIG. 6 provides an example of a synthetic element and corresponding program access source code. Though FIG. 6 illustrates source code, in one embodiment, the extension may provide intermediate language code to be inserted into the IL produced by the compiler. In various embodiments, source code or native code may be inserted.

The process flow may flow to block 420, where the synthetic element is deleted from the target program, or an intermediate version thereof. In one implementation, the compiler may perform this action after it has used the synthetic element to perform type-checking or to retrieve program access source code. In one implementation, deleting the synthetic element may be performed by omitting an action of including the element in an intermediate version of the program code as contrasted with including other elements or representations thereof. In one implementation, deleting the synthetic element may be performed by marking the element in a manner to indicate that further processing of the element is not to be performed; for example, it may be indicated in comment delineation.

The process may flow to block 422, where the program access code may be inserted into the target program. It is to be noted that the insertion of program access code may be performed at any of various compilation stages. For example, insertion of IL may be performed as part of a translation of source code into an intermediate language.

The process may flow to block 424, which terminates loop 414. It may loop back to loop 414 or exit the loop, based on source program configuration, compiler logic, or process implementation.

Though not illustrated in process 400, in one embodiment, the process may include using a synthetic type corresponding to a synthetic element to perform static type checking. This may be performed by the compiler during a compilation phase. This action is illustrated and discussed in FIG. 5 herein.

After exiting loop 414, the process may flow to block 426. Though not illustrated in FIG. 4, the actions of block 426 may be performed during runtime of the target program, and may be based on the logic of the target program, as well as other factors. At block 426, at least a portion of the access code previously inserted into the target program may be used to query the WSS. This block may be repeated any number of times, based on program logic. The queries of block 426 may retrieve data from the WSS, as indicated in FIG. 2.

The process may flow to block 426, and exit or return to a calling program.

FIG. 5 illustrates a process 500 for using a synthetic element and corresponding information to facilitate program development. Process 500, or a portion thereof, may be used to implement at least some of the actions of block 312 of FIG. 3 or block 412 of FIG. 4. In one implementation, portions of process 500 may be performed by editor 204 or compiler 208, of FIG. 2. In various implementations, the actions of process 500 may be performed in a variety of orders, or concurrently. The process may be performed with any subset of the illustrated actions, or with additional actions. The illustrated ordering is provided to present a list of possible actions, and is not meant to limit the process to the illustrated list or order. As discussed above, process 500 may be performed during an editing session.

The actions of process 500 may be performed based on schema information retrieved from a data store, such as OSIS 106 or WSS 110. The schema information may include a list of properties, methods, schema classes, or fields associated with a synthetic element, a query, a category, or other specification.

Figure 6B:
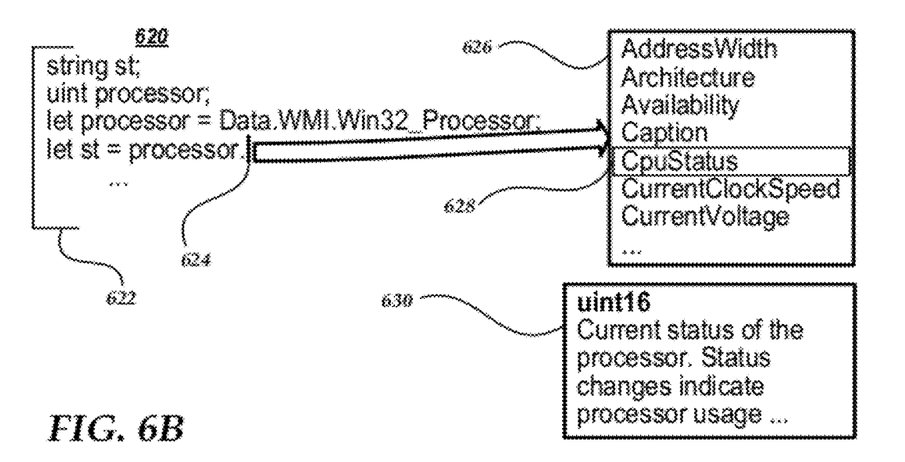

The illustrated portions of process 500 may be initiated at block 502, where completion suggestions may be provided to an editor or to a user. Completion lists 606 and 626 of FIG. 6 illustrate example completion lists, and are discussed below.

The process may flow to block 504, where tool tips, "quick info,", or other help information may be provided. Help information boxes 610 and 630 illustrate examples of a user interface displaying help information. In some implementations, tool tips or quick info may be displayed to a user in response to a hovering of a pointer over a corresponding string of source code or symbol, though various other user interfaces may be employed.

The process may flow to block 506, where a link to one or more web pages may be provided. The links may be provided to a user in a visual representation. In one implementation, information from a web page may be retrieved and provided to a user. For example, a block of text or visual element may be retrieved from a WSS and displayed to a user. A link to a web page may provide a user with a snapshot of information that might be provided by a subsequent query at runtime. One or more links may lead a user to a Web page providing documentation of a referenced data item.

The process may flow to block 508, where synthetic types derived from schema element information may be used to perform static type checking of the program code. These actions may be similar to that described for blocks 315 and 415 herein. In one embodiment, static type checking may be performed at block 508 during an editing session, at blocks 315 or 415 during a module compilation, or both.

The process may flow to block 510, and exit or return to a calling program, such as process 300 or 400.

FIGS. 6A-C illustrates example screen shots 600 and 620, respectively, of a user interface that facilitates program development in accordance with some mechanisms described herein. Screen shots 600 and 620 include views of source code snippet 602 and 622, respectively, which may be portions of a program source code 202 of FIG. 2. Each source code snippet may be displayed by editor 204. Source code snippets 602 and 622 are edited to illustrate certain lines of interest; various other lines of source code may be included, though not illustrated herein. In one embodiment, source code snippet 622 contains the source code of source code snippet 602 after editing.

As shown in FIG. 6A, source code snippet 602 includes a reference to a property called "WMI" of an object. "WMI" refers to an OSIS in the system. Cursor 604 is located within code snippet 602 at a location following the string "Data.WMI." A cursor placed in a position following an identifier and a period may invoke some of the mechanisms described herein, such as retrieving data identifier information, creating a completion list, and presenting the completion list to a user. Example screen shot 600 includes a view of a completion list 606, which may be displayed by editor 204 in response to placement of cursor 604.

In the illustrated example of FIG. 6A, completion list 606 includes a list of instrumentation data of the OSIS that are available to query. In one embodiment, this list may be provided by an extension component, such as extension 218 or 220. In one embodiment, a list provided by an extension component may be transformed by renaming list elements, filtering elements, reordering elements, or in another manner.

In some embodiments, the entries of a completion list may be filtered based on characters that have been entered in the editor. For example, if the letter 'b' were entered after the period, elements other than those beginning with the letter 'b' may be excluded from a resulting completion list.

In one embodiment, a user may select an item from completion list 606. Box 608 represents a selected item, which may be highlighted or indicated in various ways. One embodiment may display information box 610, with information corresponding to the selected item. For example, information box 610 may display an explanation of the selection, a declaration of a method, including specification of its parameters, text descriptive of the method, or a list of exceptions that may be caused by the method. Various implementations may display other types of information.

In one embodiment, a user may enter a command to insert the selected completion list item into the source code. Source code snippet 622 illustrates source code after the item "Win32_Processor" is selected and inserted into the source code. In the source code statement fragment "Data.WMI.Win32_Processor", "Win32_Processor" appears as a property of the "WMI" object. It is a synthetic element, in that it is a placeholder for data access code. The placeholder is presented as statically declared property to present the user with a view as if it were a real property.

In FIG. 6B, the variable named "processor" receives an object representing the processor property. Cursor 624 is shown following the source code string "processor." and triggers completion list 626. Mechanisms described herein may be employed to retrieve the items of completion list 626.

In the illustrated example, a box 628 represents a selected item "CpuStatus" in completion list 626. One embodiment may display information box 630, with information corresponding to the selected item. For example, information box 630 may display a type of the selected item as well as an explanation of the selection. A variety of information may be so displayed.

A user may enter a command to insert the selected completion list item into the source code. Though not shown, the string "CpuStatus" representing a property of the "processor" object may be inserted into the source code at the location of cursor 624. "CpuStatus" is a synthetic element presented as an actual property of the object named "processor."

Figure 6C:
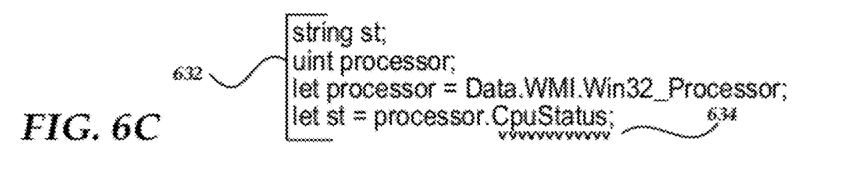

FIG. 6C illustrates an example code snippet 632, containing code as it may appear after the synthetic element name "CpuStatus" is inserted into the source code. As noted, an extension component may provide schema elements, such as data types, with each synthetic element. In the illustrated example of FIG. 6B, the synthetic element "CpuStatus" has a type of unit 16, indicating an integer type. In code snippet 632, however, this element is assigned to a variable "st" that is declared to be a string. As discussed at box 508, the type associated with a synthetic element may be used to perform static type checking. Editor 204 may, in conjunction with compiler 208, perform type checking for each displayed source line. In this example, an assignment of a synthetic type unit 16 to a string variable is recognized as an error. Error indicator 634 provides a visual cue that there is an error relating to the synthetic element "CpuStatus" resulting from the type mismatch. In various embodiments, errors determined during static type checking may be indicated in a variety of ways.

Though FIGS. 6A-C use an OSIS as an example data store, a similar interface may be employed when accessing a Web-based semantic store.

Figure 7:
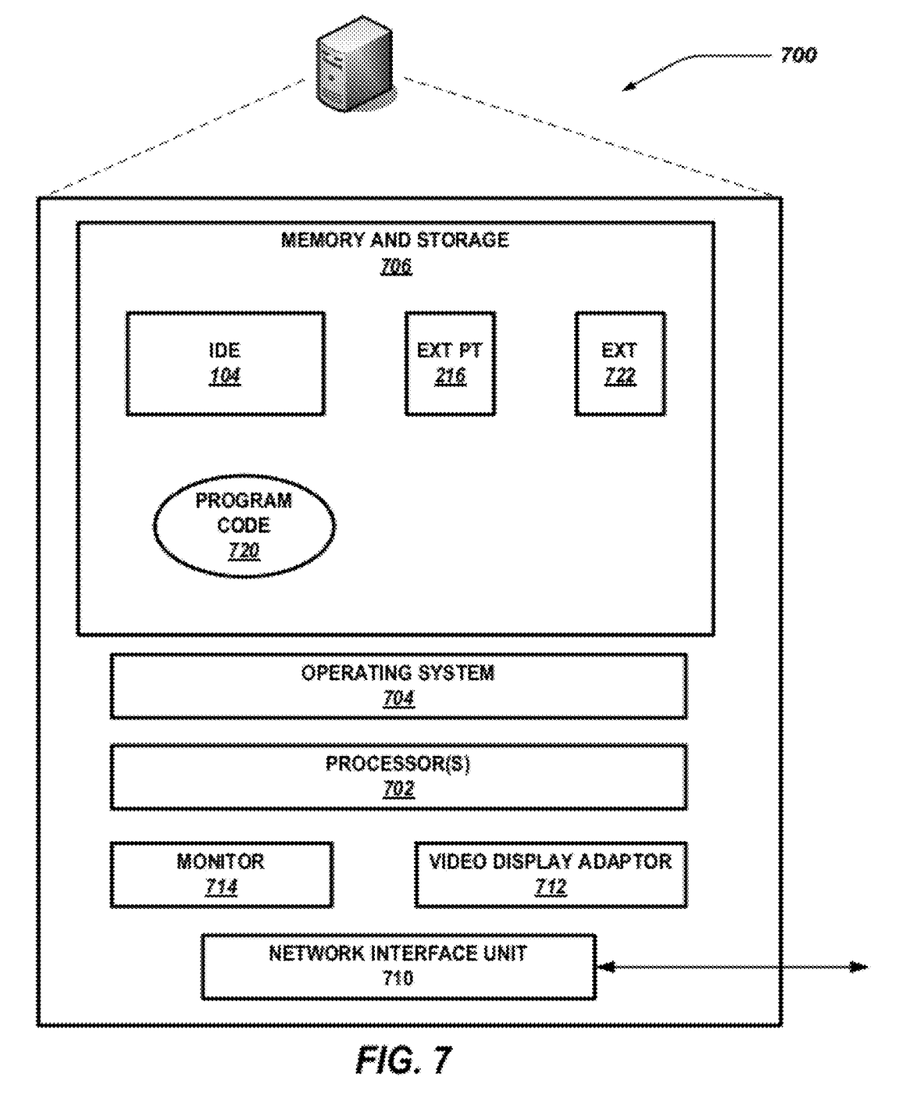
FIG. 7 is a block diagram showing one embodiment of a computing device, illustrating selected components of a computing device that may be used to perform functions described herein.

FIG. 7 is a block diagram showing one embodiment of a computing device 700, illustrating selected components of a computing device that may be used to implement mechanisms described herein, including system 200 and process 300, 400, or 500. Computing device 700 may include many more components than those shown, or may include less than all of those illustrated. Computing device 700 may be a standalone computing device or part of an integrated system, such as a blade in a chassis with one or more blades.

As illustrated, computing device 700 includes one or more processors 702, which perform actions to execute instructions of various computer programs. In one configuration, each processor 702 may include one or more central processing units, one or more processor cores, one or more ASICs, cache memory, or other hardware processing components and related program logic. Processor 702 may be processor 212 of FIG. 2. As illustrated, computing device 700 includes an operating system 704. Operating system 704 may be a general purpose or special purpose operating system. The Windows® family of operating systems, by Microsoft Corporation, of Redmond, Wash., includes examples of operating systems that may execute on computing device 700.

Memory and storage 706 may include one or more of a variety of types of non-transitory computer storage media, including volatile or non-volatile memory, RAM, ROM, solid-state memory, disk drives, optical storage, or any other medium that can be used to store digital information.

Memory and storage 706 may store one or more components described herein or other components. In one embodiment, memory and storage 706 stores IDE 104 and extension point 216 of FIG. 2. In one embodiment, memory and storage 706 stores one or more extension components 722. Extensions 218 and 220 of FIG. 2 are examples of extension component 722. Memory and storage 706 may store target program code 720, or a portion thereof. Target program code 720 may include one or more of program source code 202, IL 209, or native code 210, or portions thereof. Though not illustrated, OSIS 106 may be stored in memory and storage 706.

Any one or more of the components illustrated as stored in memory and storage 706 may be moved to different locations in RAM, non-volatile memory, or between RAM and non-volatile memory by operating system 704 or other components. In some configurations, these components may be distributed among one or more computing devices.

Computing device 700 may include a video display adapter 712 that facilitates display of program code or other information to a user. Though not illustrated in FIG. 7, computing device 700 may include a basic input/output system (BIOS), and associated components. Computing device 700 may also include a network interface unit 710 for communicating with a network. Software components, such as those stored in memory and storage 706, may be received via transitory media and network interface unit 710. Computing device 700 may include one or more display monitors 714. Embodiments of computing device 700 may include one or more input devices such as a keyboard, pointing device, touch screen, keypad, audio component, microphone, voice recognition component, or other input/output mechanisms.

It will be understood that each block of the flowchart illustration of FIGS. 3-5, and combinations of blocks in the flowchart illustration, can be implemented by software instructions. These program instructions may be provided to a processor to produce a machine, such that the instructions, which execute on the processor, create means for implementing the actions specified in the flowchart block or blocks. The software instructions may be executed by a processor to provide steps for implementing the actions specified in the flowchart block or blocks. In addition, one or more blocks or combinations of blocks in the flowchart illustrations may also be performed concurrently with other blocks or combinations of blocks, or even in a different sequence than illustrated without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended

What is claimed as new and desired to be protected by Letters Patent of the United States is:

1. A computer-implemented method of facilitating development of a target program that accesses a data store, the target program is a programming language, the method comprising:
   a) during an editing session, receiving a target program reference to the data store, wherein the target program reference is an identifier in the programming language;
   b) during the editing session, in response to receiving the target program reference, querying the data store for identification of one or more schema elements that are available for querying, the schema elements including one or more type descriptors;
   c) inserting into the target program a synthetic method or variable name corresponding to at least one of the one or more schema elements;
   d) performing static type checking of the synthetic method or variable name based on the one or more type descriptors of the schema elements; and
   e) inserting, into the target program, program code for accessing at least one data item corresponding to the synthetic method or variable name and the at least one of the one or more schema elements, wherein the method further comprises translating the synthetic method or variable name into the program code for accessing, and wherein the program code for accessing comprises intermediate language code or native code and includes logic to perform actions representing by the synthetic method or variable name.

2. The computer-implemented method of claim 1, further comprising during the editing session, providing a completion list, each item of the completion list corresponding to a corresponding schema element of the one or more schema elements.

3. The computer-implemented method of claim 1, the synthetic method or variable name inserted into source code of the target program, the program code for accessing inserted into an intermediate language code of the target program.

4. The computer-implemented method of claim 1, the synthetic method or variable name providing an appearance of a method or variable defined in source code of the target program.

5. The computer-implemented method of claim 1, further comprising employing the program code for accessing to access the OSIS during runtime of the target program.

6. The computer-implemented method of claim 1, further comprising compiling the target program, the compiling comprising recognizing the synthetic method or variable name and inserting the program code for accessing to implement the synthetic method or variable name.

7. The computer-implemented method of claim 1, further comprising receiving one or more schema elements that comprise a small portion of an entire available schema.

8. The computer-implemented method of claim 1, wherein the one or more schema elements queried for is a small portion of an entire corresponding schema.

9. The computer-implemented method of claim 1, wherein the data store is an operating system instrumentation store.

10. The computer-implemented method of claim 1, wherein the data store is a Web-based Semantic Store.

11. The computer-implemented method of claim 1, the synthetic method or variable name representing an object and inserted into a first program statement, the method further comprising inserting a second synthetic method or variable name into a second program statement, wherein the second method or variable name represents a property of the object.

12. A computer-readable hardware storage medium comprising computer program instructions for facilitating development of a target program that accesses a data store, the program instructions executable by one or more processors to perform actions including:
   a) during an editing session, receiving a target program reference to the data store;
   b) during the editing session, in response to receiving the target program reference, querying a data store extension component for identification of a schema element of the data store and a type corresponding to the schema element;
   c) during the editing session, providing information to a user descriptive of the schema element;
   d) inserting into the target program a synthetic method or variable name corresponding to the schema element;
   e) performing static type checking of the synthetic method or variable name based on a type corresponding to the corresponding schema element; and
   f) inserting, into the target program, program code for accessing at least one data item corresponding to the schema element, wherein the actions further comprise translating the synthetic method or variable name into the program code for accessing, and wherein the program code for accessing comprises intermediate language code or native code and includes logic to perform actions represented by the synthetic method or variable name.

13. The computer-readable hardware storage medium of claim 12, the actions further comprising providing an argument specification corresponding to the schema element and facilitating inserting one or more arguments based on the argument specification into the target program.

14. The computer-readable hardware storage medium of claim 12, the synthetic method or variable name inserted into source code of the target program, the program code for accessing inserted into an intermediate language code of the target program.

15. The computer-readable storage medium of claim 12, the synthetic method or variable name providing an appearance of a method or variable defined in source code of the target program.

16. The computer-readable hardware storage medium of claim 12, providing information descriptive of the schema element comprising providing a completion list, each element of the completion list corresponding to a schema element, the method further comprising receiving a user selection of an item from the completion list.

17. The computer-readable hardware storage medium of claim 12, the actions further comprising enabling the target program to include a program statement assigning to a program variable an object represented by the synthetic method or variable name corresponding to the schema element.

18. A computer system for facilitating development of a target program, the system including a computer hardware and computer program instructions executable by a processor, the system comprising:
  a) an editor configured to recognize a reference to a data store, the reference not including a database query string;
  b) an extension component that receives the reference and, in response, provides a list of schema elements of the data store that are available for querying, each schema element having a corresponding data type;
  c) an interface component that provides to a user the list of schema elements, enables selection of a schema element, and enables insertion, into the target program, of a synthetic method or property name corresponding to the selected schema element; and
  d) a compiler component that performs static type checking of the synthetic method or property name based on the corresponding data type, and translates the synthetic method or property name into program code for querying the data store, wherein the translating comprises: inserting, into the target program, the progam for querying the data store; and wherein the program code for querying the data store comprises intermediate language code or native code and includes logic to perform actions represented by the synthetic method or property name.

19. The computer system of claim 18, further comprising facilitating development of target program source code including one or more synthetic method calls or property references that appear similar to locally defined method calls or properties.

20. The computer system of claim 18, the compiler selectively indicating a type error corresponding to the synthetic method or property name during an editing session or a compilation of the target program.

21. The computer system of claim 18, the interface component providing a link to a Web page that provides documentation of the synthetic method or property name.

22. The computer system of claim 18, wherein the extension component, in response to receiving the reference, queries the OSIS for schema elements associated with the reference.

* * * * *